(12) United States Patent
Kim (10) Patent No.: US 11,092,073 B2
(45) Date of Patent: Aug. 17, 2021

(54) COMPRESSOR AND METHOD FOR DETERMINING BLADE DEFORMATION AND GAS TURBINE INCLUDING THE COMPRESSOR

(71) Applicant: DOOSAN HEAVY INDUSTRIES & CONSTRUCTION CO., LTD., Changwon-si (KR)

(72) Inventor: Sang Jo Kim, Gimhae-si (KR)

(*) Notice: Subject to any disclaimer, the term of this patent is extended or adjusted under 35 U.S.C. 154(b) by 62 days.

(21) Appl. No.: 16/295,080

(22) Filed: Mar. 7, 2019

(65) Prior Publication Data

US 2019/0316519 A1 Oct. 17, 2019

(30) Foreign Application Priority Data

Apr. 13, 2018 (KR) .................. 10-2018-0043015

(51) Int. Cl.
*F02C 3/04* (2006.01)
*G01B 21/32* (2006.01)
*F01D 21/00* (2006.01)

(52) U.S. Cl.
CPC .............. *F02C 3/04* (2013.01); *G01B 21/32* (2013.01); *F05D 2260/80* (2013.01)

(58) Field of Classification Search
CPC ....... G06T 7/001; G01B 11/14; G01B 11/303; G01B 13/04; G01B 15/04; G01B 21/32; F05D 2260/80
See application file for complete search history.

(56) References Cited

U.S. PATENT DOCUMENTS

| 4,046,434 | A | * | 9/1977 | Moreman, III | ........... | F01D 7/00 384/582 |
| 4,969,326 | A | * | 11/1990 | Blessing | ............... | F04D 29/083 60/226.1 |
| 7,696,893 | B2 | | 4/2010 | Cairo et al. | | |
| 7,774,157 | B2 | * | 8/2010 | Bouron | ................... | F01D 5/141 702/147 |
| 9,530,209 | B2 | * | 12/2016 | Hatcher, Jr. | ............ | G01B 11/26 |
| 10,013,752 | B2 | * | 7/2018 | Salm | ...................... | G01B 21/16 |
| 10,504,218 | B2 | * | 12/2019 | Finn | ...................... | G06K 9/6278 |

(Continued)

FOREIGN PATENT DOCUMENTS

| KR | 10-1365573 B1 | 2/2014 |
| KR | 10-1503669 B1 | 3/2015 |
| KR | 10-2017-0122024 A | 11/2017 |

*Primary Examiner* — Woody A Lee, Jr.
*Assistant Examiner* — Brian O Peters
(74) *Attorney, Agent, or Firm* — Harvest IP Law, LLP (57) ABSTRACT

A compressor for a gas turbine having means for determining whether a blade of the compressor has been deformed includes a rotor having an outer circumference on which a blade is formed; a monitoring part for monitoring a driving state of the blade in order to acquire monitoring information on the driving state of the blade; and a control part for determining whether the blade has been deformed based on the monitoring information. The monitoring part detects time points at which the trailing edge and the leading edge of the blade pass and acquire the detection time information of the detected time point. The control part receives the detection times of the trailing edge and the leading edge from the monitoring part and determines whether the blade has been deformed based on the detection time of the trailing edge and the detection time of the leading edge.

11 Claims, 8 Drawing Sheets

(56) References Cited

U.S. PATENT DOCUMENTS

| | | |
|---|---|---|
| 2013/0255398 A1 | 10/2013 | Philipsen et al. |
| 2015/0199805 A1 | 7/2015 | Hatcher, Jr. et al. |
| 2015/0239043 A1* | 8/2015 | Shipper, Jr. .......... F01D 21/003 415/208.1 |
| 2015/0252789 A1 | 9/2015 | Bunge |
| 2015/0345325 A1* | 12/2015 | Khibnik ................ F01D 21/003 60/805 |
| 2016/0258440 A1 | 9/2016 | Henry |

* cited by examiner

Camber line Image            Reference Image

COMPRESSOR AND METHOD FOR DETERMINING BLADE DEFORMATION AND GAS TURBINE INCLUDING THE COMPRESSOR

CROSS-REFERENCE TO RELATED APPLICATIONS

This application claims priority to Korean Patent Application No. 10-2018-0043015, filed on Apr. 13, 2018, which is incorporated herein by reference in its entirety.

BACKGROUND OF THE DISCLOSURE

Field of the Disclosure

The present disclosure relates to a compressor and a gas turbine, and more particularly, to a compressor having means for determining whether a blade of a compressor has been deformed and a structure capable of performing the method, and a gas turbine including the compressor.

Description of Related Art

A gas turbine device is being utilized as a power system in many fields today in that it may discharge less exhaust gas while providing a large amount of power, and may maintain performance relatively stably. The gas turbine device obtains energy by combusting a mixture of fuel and compressed air from a compressor and rotating a blade and a rotor, that is, a turbine, by using high temperature/high pressure gas generated by the combustion. Although the blade in the compressor is generally made of a composite material so that it can withstand the high temperature and high pressure, the blade may be deformed due to occurrence of cracks or warping after a period of usage. When the blade is thus deformed, efficiency of the gas turbine device as well as the compressor may be reduced. The deformation may also induce additional problems such as damage to other components.

The present disclosure proposes a compressor having means for determining whether the blade has been deformed in order to prevent the above problems while avoiding the premature replacement of a deformed blade.

The present disclosure is intended to solve the problems, and an object of the present disclosure is to provide additional technical elements that may solve the above-described technical problems and may not easily be invented by those skilled in the art.

Related Art Document

[Patent Document 1] Korean Registered Patent No. 10-1365573 (registered on Feb. 21, 2014)

SUMMARY OF THE DISCLOSURE

An object of the present disclosure is to monitor a driving state of a blade in a compressor, in particular, to measure the rotation times of the leading edge and the trailing edge of the blade, and to determine whether the blade has been deformed from a difference between the measured rotation times.

In addition, another object of the present disclosure is to provide a tip sensor for measuring the rotation times of the leading edge and the trailing edge of the blade, respectively, thereby accurately detecting the leading edge or the trailing edge of the rapidly rotating blade, and measuring an accurate rotation time.

In addition, still another object of the present disclosure is to determine whether the blade has been deformed by monitoring the blade in operation, acquiring the shape image of the blade viewed from above, and comparing the thus acquired shape image with a previously stored reference image.

The technical objects of the present disclosure are not limited to the above-described technical objects, and other technical objects that are not described may be clearly understood by the ordinary skilled in the art from the following description.

According to one aspect of the present disclosure, a compressor may include a rotor having an outer circumference on which a blade is formed; a monitoring part for monitoring a driving state of the blade in order to acquire monitoring information on the driving state of the blade; and a control part for determining whether the blade has been deformed based on the monitoring information.

The monitoring part may be configured to detect time points at which the trailing edge and the leading edge of the blade pass and to acquire the detection time information of the detected time point. The control part may be configured to receive the detection times of the trailing edge and the leading edge from the monitoring part and to determine whether the blade has been deformed based on the detection time of the trailing edge and the detection time of the leading edge.

The monitoring part may include a first tip sensor for detecting a time point at which the leading edge of the blade passes and for acquiring a first detection time of the detected time point; and a second tip sensor for detecting the time point at which the trailing edge of the blade passes and for acquiring a second detection time of the detected time point. The first tip sensor may be disposed at a position facing the leading edge, and the second tip sensor may be disposed at a position facing the trailing edge.

The control part may be configured to calculate an estimated chord length of the blade by using a time difference between the first detection time and the second detection time, a speed of the rotor, and a predetermined width value.

The control part may be further configured to determine whether the blade has been deformed according to whether a value of the estimated chord length of the blade is outside a predetermined range.

The compressor may further include a storage part for storing reference data. The control part may be further configured to compare the estimated chord length of the blade with the reference data to determine whether the blade has been deformed.

The monitoring part may be further configured to measure a gap value of the blade. The control part may be further configured to determine whether the measured gap value is outside a predetermined range to determine whether the blade has been deformed.

The monitoring part may be configured to acquire the shape image of the blade in operation. The control part may be configured to receive the shape image of the blade from the monitoring part and to determine whether the blade has been deformed from the received shape image.

The monitoring part may be arranged in a vane carrier and radially spaced apart from a tip of the blade.

The control part may be further configured to extract a camber line for connecting the leading edge and the trailing edge from the shape image.

According to another aspect of the present disclosure, there is provided a gas turbine including a compressor for compressing air; a combustor for producing combustion gas by combusting a mixture of fuel and the compressed air; and a turbine for generating a rotation power by the combustion gas, wherein the compressor of the gas turbine is consistent with the above compressor.

According to another aspect of the present disclosure, there is provided a method for determining whether a blade in a compressor has been deformed. The method may include steps of (a) monitoring a driving state of the blade in order to acquire monitoring information on the driving state of the blade; and (b) determining whether the blade has been deformed by using the monitoring information.

The monitoring may include detecting time points at which the trailing edge and the leading edge of the blade pass and acquiring the detection time of the detected time point, and the determining whether the blade has been deformed may use the detection time of the trailing edge and the detection time of the leading edge. The method may further include (b-1) calculating a time difference between the detection time of the trailing edge and the detection time of the leading edge; and (b-2) calculating an estimated chord length of the blade by using the time difference, a rotor speed, and a predetermined width value. The method may further include (b-3) determining whether the blade has been deformed according to whether a value of the estimated chord length of the blade is outside a predetermined range; or (b-4) determining whether the blade has been deformed based on a comparison result between the value of the estimated chord length of the blade and previously stored reference data. The monitoring may include photographing the shape image of the rotating blade, and the determining may include comparing the shape image of the blade with previously stored reference data in order to determine whether the blade has been deformed according to the comparison result.

According to the present disclosure, it is possible to relatively and accurately determine whether the blade has been deformed by utilizing only simple numerical data such as the rotation times of the edges by using the monitoring part, more specifically, the tip sensor.

In addition, according to another embodiment of the present disclosure, it is possible not only to utilize the rotation times of the edges to determine whether the blade has been deformed but also to compare the shape image of the blade with the reference data, thereby determining whether the blade has been deformed more accurately.

The effects of the present disclosure are not limited to the above-described effects, and other effects that are not described may be clearly understood by those skilled in the art from the following description.

DESCRIPTION OF SPECIFIC EMBODIMENTS

Hereinafter, preferred embodiments of the present disclosure will be described in detail with reference to the accompanying drawings. The advantages and features of the present disclosure, and the method for achieving them will become apparent with reference to the embodiments that will be described later in detail together with the accompanying drawings. However, the present disclosure is not limited to the embodiments disclosed below but may be implemented in many various forms, and rather, these embodiments are provided so that the present disclosure will be thorough and complete, and will fully convey the scope of the disclosure to those skilled in the art, and the present disclosure is only defined by the scope of the claims. The same reference numerals refer to the same components throughout the specification.

Unless otherwise defined, all terms (including technical and scientific terms) used herein have the same meaning as commonly understood by one of ordinary skill in the art to which this disclosure belongs.

In addition, terms, such as those defined in commonly used dictionaries, will not be interpreted in an idealized or overly formal sense unless expressly so defined herein. The terminology used in this specification is for the purpose of describing the embodiments and is not intended to limit the present disclosure. In this specification, the singular forms include the plural forms as well, unless the context clearly indicates otherwise.

The terms "comprises" and/or "comprising," or "includes" and/or "including" when used in this specification, do not preclude the presence or addition of one or more other components, steps, operations, and/or elements of the components, steps, operations, and/or elements that are described.

First, a structure of a gas turbine and a compressor will be described with reference to FIGS. 1 and 2.

Figure 1:
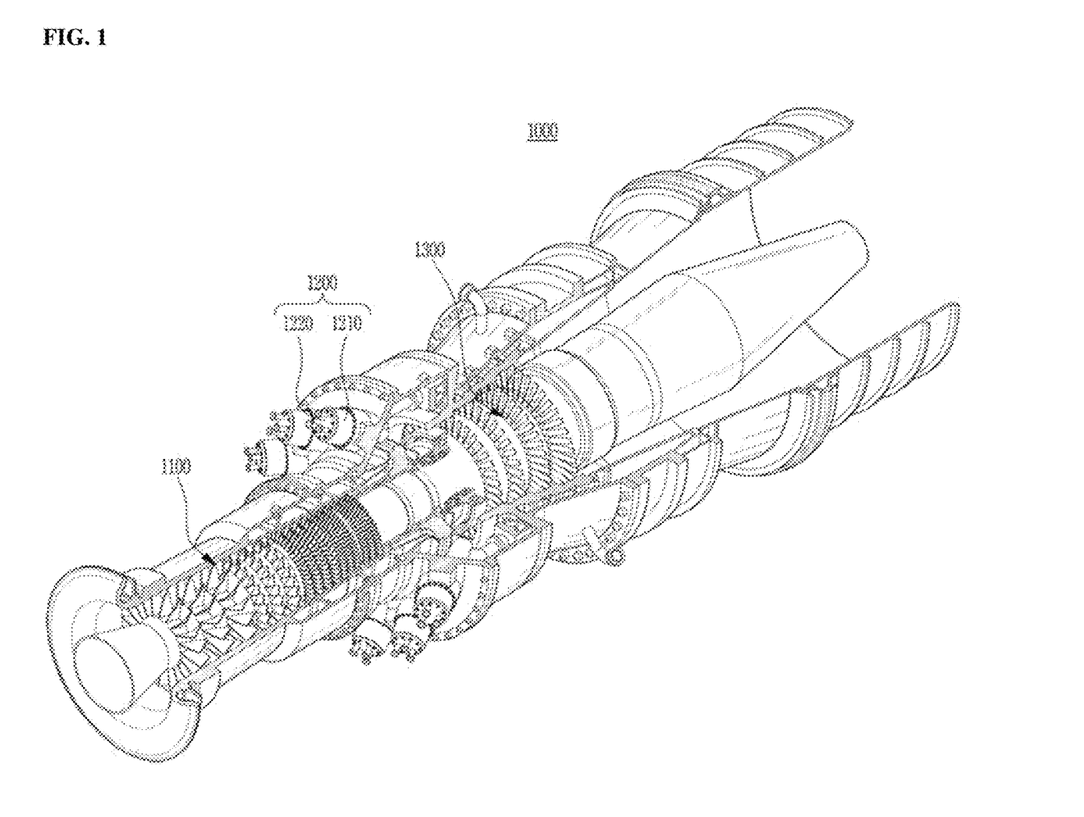
FIG. 1 is a cutaway perspective view of a gas turbine in which may be applied a compressor according to the present disclosure.

Referring to FIG. 1, a gas turbine device 1000 includes a compressor 1100, a combustor 1200, and a turbine 1300. The compressor 1100 sucks and compresses the outside air, and the combustor 1200 combusts a mixture of fuel and the compressed air, and the turbine 1300 is rotated by the combustion gas discharged from the combustor 1200.

Figure 2:
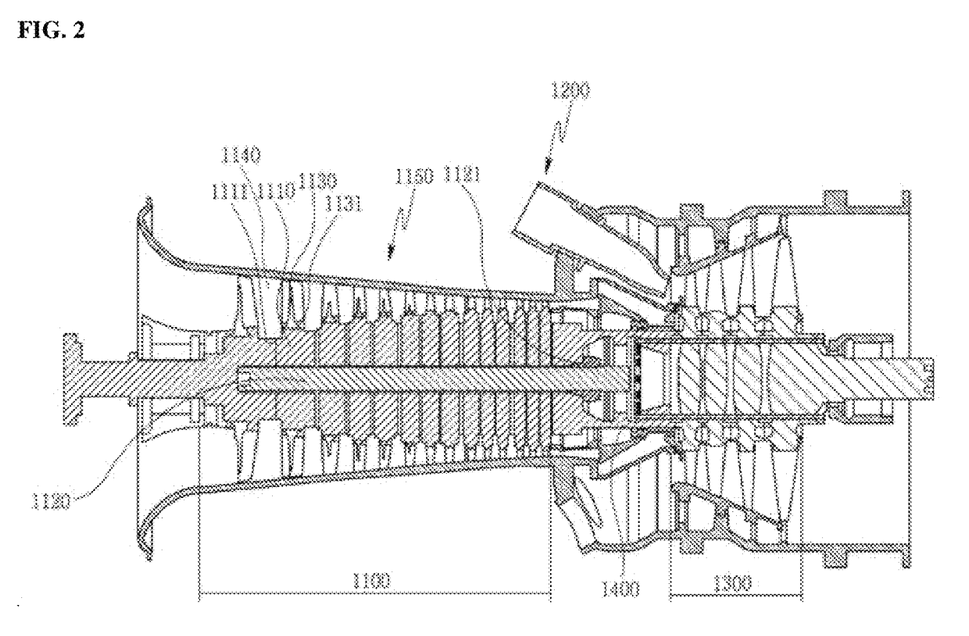
FIG. 2 is a cross-sectional view of the gas turbine of FIG. 1.

Referring to FIG. 2, the compressor 1100 includes a rotor disk 1110, a center tie rod 1120, a blade 1130, a vane 1140, and a housing 1150.

The rotor disk 1110 has a blade 1130 formed on its outer circumferential surface and rotates according to the rotation of the center tie rod 1120 to rotate the blade 1130.

As shown in FIG. 2, plural rotor disks 1110 may be fastened by the single center tie rod 1120 so as not to be axially spaced apart from each other. The center tie rod 1120 passes through the respective rotor disks 1110, which are thus aligned along the axial direction. A plurality of protrusions (not illustrated) may be formed on the outer circumferential portion of each rotor disk 1110 to engage with a flange 1111 so that adjacent rotor disks 1110 rotate together.

Meanwhile, a compressed air supply passage may be formed in at least one of the plurality of rotor disks 1110. The compressed air compressed by the blade 1130 may be moved through the compressed air supply passage to the turbine 1300 side to cool the turbine blade.

The center tie rod 1120 receives the torque generated from the turbine 1300 to rotate the rotor disk 1110. For this purpose, a torque tube 1400 may be disposed between the compressor 1100 and the turbine 1300 as a torque transfer member for transmitting the rotational torque generated in the turbine 1300 to the compressor 1100.

One end of the center tie rod 1120 is fastened in the farthest upstream rotor disk. The other end of the center tie rod 1120 is inserted into and fastened to the torque tube 1400 using a compression nut 1121, which presses the torque tube 1400 toward the rotor disk 1110 side so that each of the rotor disks 1110 becomes air tight.

Plural blades 1130 may be radially coupled to the outer circumferential surface of the rotor disk 1110, which may be arranged in multiple stages. In the present embodiment, each blade 1130 is formed with a dove tail 1131 for being fastened to the rotor disk 1110, although it should be understood that the coupling may be achieved variously. The blade 1130 rotates according to the rotation of the rotor disk 1110, compresses the received air, and moves the compressed air to a vane 1140 at the rear (downstream) of the blade 1130. Thus, the vane 1140 guides the compressed air from one blade 1130 to another, which are respectively positioned on either side (upstream and downstream) of the vane 1140.

Meanwhile, the housing 1150 forms the outer shape of the compressor 1100. The housing 1150 receives the rotor disk 1110, the center tie rod 1120, the blade 1130, the vane 1140, and the like. The housing 1150 may also accommodate a connection pipe for transmitting air compressed by the multi-staged blades 1130 into the turbine 1300 side to cool the turbine blades.

One configuration of a gas turbine having a compressor has been described above. Hereinafter, the compressor according to the present disclosure will be described with reference to FIGS. 3 to 8.

The compressor according to the present disclosure may basically include a rotor for rotating around a rotation shaft, a plurality of blades formed along the circumference of the rotor, a monitoring part for monitoring a driving state of the blades, and a control part for receiving monitoring information from the monitoring part and then determining whether the blade has been deformed. As will be described later, the compressor according to the present disclosure may be divided into a first embodiment and a second embodiment according to how the monitoring part and the control part are implemented.

Figure 3:
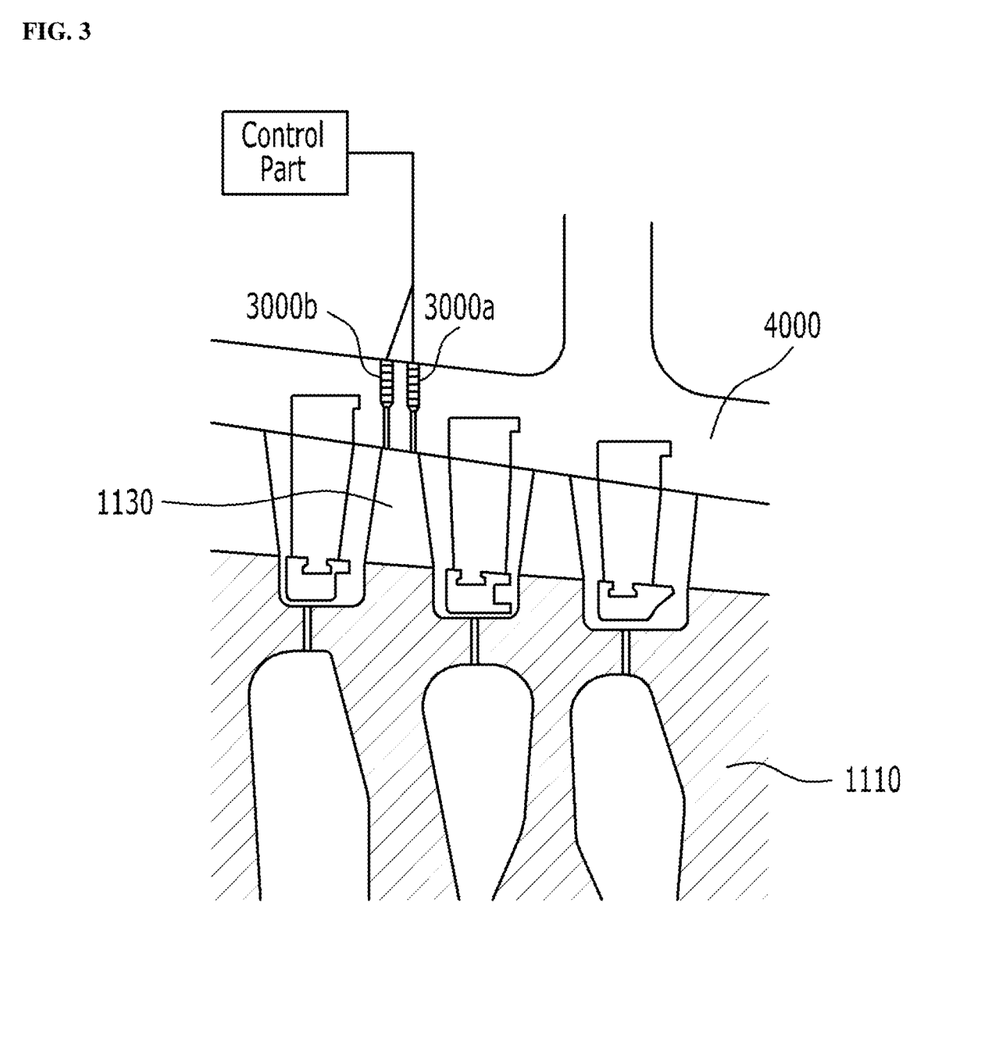
FIG. 3 is a diagram illustrating the compressor according to the present disclosure.

FIG. 3 illustrates the compressor according to a first embodiment of the present disclosure, which includes the plurality of rotor disks 1110, the plurality of blades 1130, and the monitoring part. The compressor of the first embodiment may include a control part for performing logic for determining whether the blade has been deformed.

The plurality of rotor disks 1110 are coupled to form a rotor as a single body, and the rotor rotates around the rotation shaft. The plurality of blades 1130 are formed on the outer circumferential surface of the rotor disk 1110, and as described above, the blade 1130 compresses the air while rotating together according to the rotation of the rotor disk 1110. Here, the rotor disk 1110 is part of a rotor having an outer circumference on which at least one blade 1130 is formed.

The monitoring part is configured to detect the point in time when the edge of the blade passes a predetermined position. Upon such detection, the monitoring part acquires a value for the passing time point. The monitoring part may further measure how long it takes for an edge of the blade to transit one revolution. Preferably, the monitoring part may be composed of at least one tip sensor. As seen in FIG. 3, tip sensors 3000*a* and 3000*b* may be disposed in opposition to the tips of the blades 1130 and may be situated in a structure arranged on a radially outer side of the blade. The structure may be a vane carrier 4000.

One feature of the gas turbine device according to the present disclosure is that the monitoring part is implemented by two tip sensors 3000*a* and 3000*b*. A first tip sensor may measure the time at which the trailing edge of the blade has been detected, and a second tip sensor may measure the time at which the leading edge of the blade has been detected.

When the monitoring part is implemented by the two tip sensors 3000*a* and 3000*b*, it is preferable that they are respectively disposed so as to oppose the trailing and leading edges at which the time point of passage is measured. For example, it is preferable that the first tip sensor is provided at the position facing the trailing edge, and the second tip sensor is provided at the position facing the leading edge. That is, the first tip sensor is preferably provided at a position capable of detecting the point through which the trailing edge of the rotating blade periodically passes, and the second tip sensor is preferably provided at a position capable of detecting the point through which the leading edge of the rotating blade periodically passes.

Meanwhile, it is preferable that the monitoring part is provided in the vane carrier 4000, but the monitoring part may be provided in any structure in the gas turbine device or in the compressor, if it is a position opposing the edges of the blade. The monitoring part is preferably arranged in the vane carrier 4000 and radially spaced apart from the tips of the rotating blades by an interval.

The control part receives the detection time acquired from the above-described monitoring part, and determines whether the blade has been deformed according to a predetermined algorithm from the received detection time. The procedure of determining whether the blade has been deformed will be described later with reference to FIGS. 4 and 5.

The control part may be referred to as a controller, a microcontroller, a microprocessor, a microcomputer, or the like. In addition, the control part may be implemented by hardware, firmware, software, or a combination of these. Hardware implementation may include one or more of an application specific integrated circuit (ASIC) or a digital signal processor (DSP), a digital signal processing device (DSPD), a programmable logic device (PLD), a field programmable gate array (FPGA), or the like. Firmware or software implementation may include a module, a procedure, or a function for performing the above-described functions or operations.

Figure 4:
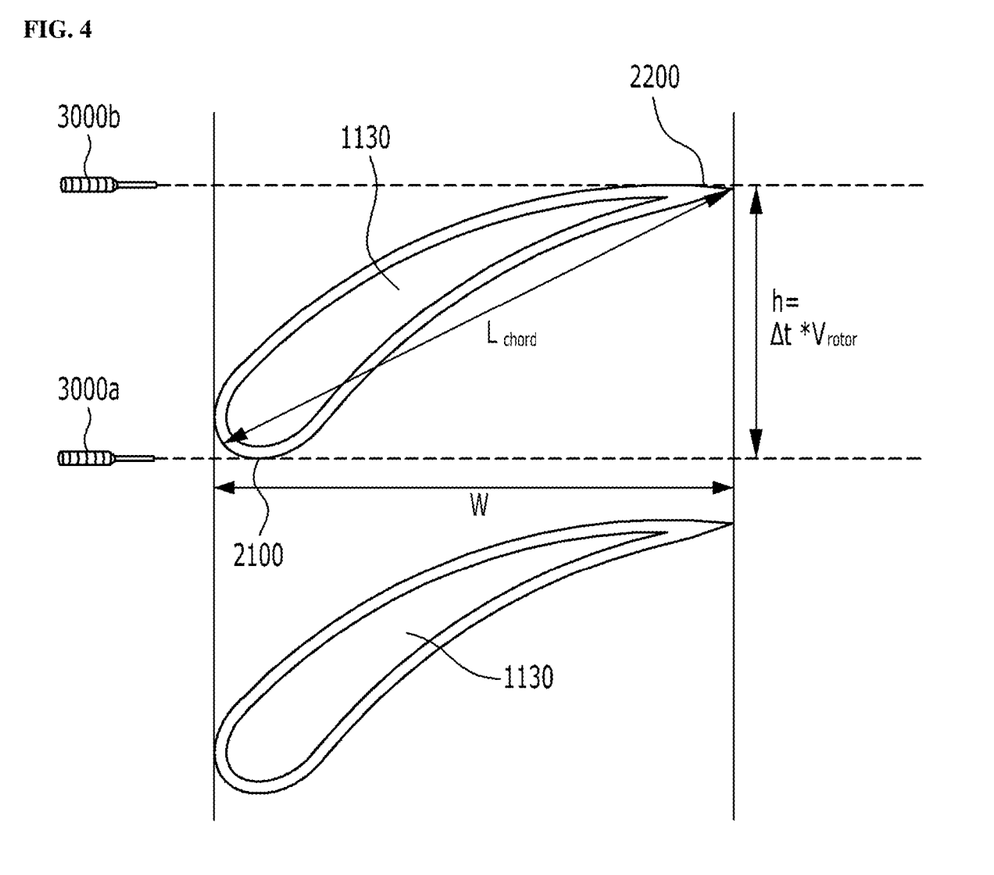
FIG. 4 is a plan view of an outer circumferential surface of the rotor disk of the compressor of according to the present disclosure in which detection times of the leading edge and the trailing edge of a blade may be measured.
Figure 5:
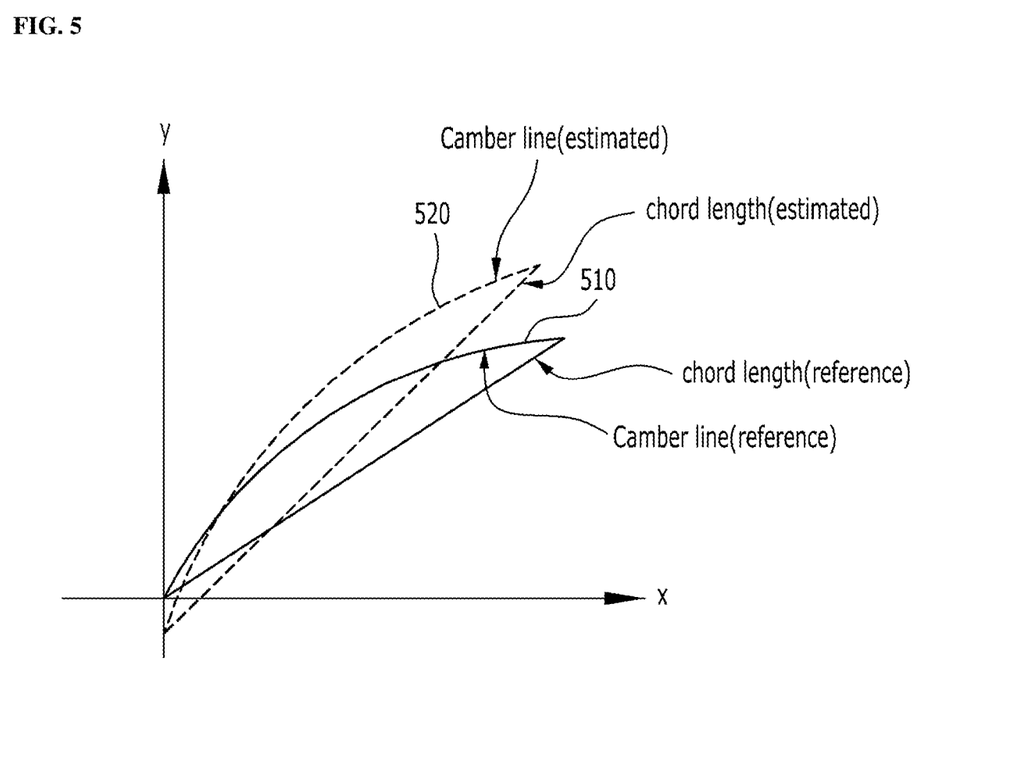
FIG. 5 is a graph comparing the chord length of the blade calculated from the time difference between the times at which the leading edge and the trailing edge have been detected with previously stored reference data.

FIGS. 4 and 5 are diagrams for explaining an embodiment of how the above-described control part determines whether the blade 1130 has been deformed.

FIG. 4 shows adjacent blades 1130 formed on the outer circumferential surface of the rotor disk 1110. Although depicted for the sake of convenience at the left side of the drawing, it should be understood that the tip sensors 3000*a* and 3000b are in fact arranged so as to face the leading edge 2100 and the trailing edge 2200 of the blade as described above.

As shown in FIG. 4, an embodiment of the present disclosure utilizes the estimated chord length $L_{chord}$ of the blade when determining whether the blade has been deformed. The chord length of the blade is estimated by using the detection times acquired by the tip sensors 3000a and 3000b.

Referring to FIG. 4, assuming that the first tip sensor 3000a measures the time t1 to detect a passing of the leading edge 2100 and that the second tip sensor 3000b measures the time t2 to detect a passing of the trailing edge 2200, the leading edge 2100 and the trailing edge 2200 pass through a predetermined position with a time difference Δt according to the curvature of the blade and the slope at which the blade is formed. When the time difference Δt between the times t1 and t2 is multiplied by the rotor speed $V_{rotor}$, a distance between the horizontal tangent to the trailing edge and the horizontal tangent to the leading edge may be obtained as a height h. Meanwhile, after obtaining the height h, the chord length of the blade may be estimated when knowing the width w. Since the width w is a predetermined value according to the specification of the rotor disk 1110, the value of the estimated chord length $L_{chord}$ of the blade may be obtained from these values. For reference, the rotor speed $V_{rotor}$ may also utilize an angular velocity value, but in the present embodiment, it is assumed that the rotor speed $V_{rotor}$ is a linear velocity to facilitate the understanding of the disclosure. Here, the rotor speed $V_{rotor}$ is typically expressed as a rotational speed measured in revolutions per minute or rpm.

Meanwhile, the estimated chord length $L_{chord}$ calculated through the procedure as in FIG. 4 may be utilized to determine whether the blade 1130 has been actually deformed. Specifically, the control part may determine that the blade 1130 has been deformed when the estimated chord length $L_{chord}$ is outside a predetermined range of values. Alternatively, the control part may determine that the blade 1130 has been deformed by comparing the estimated chord length $L_{chord}$ with reference data that is previously stored, where the reference data is the chord length of the blade in the steady state.

FIG. 5 illustrates a state where the control part compares the estimated chord length $L_{chord}$ previously calculated in FIG. 4 with the previously stored reference data. For reference, FIG. 5 shows a camber line and the chord length together to facilitate understanding. Here, reference data 510 includes a reference chord length and a reference camber length, and estimated data 520 includes an estimated chord length and an estimated camber length.

Referring to FIG. 5, the chord length of the blade in the steady state may be stored, as the reference data 510, in a storage part in the gas turbine device according to the present disclosure. The control part may compare the estimated chord length of the estimated data 520, which has been previously calculated, with the reference data 510 to determine whether the blade 1130 has been deformed. Meanwhile, the storage part in the gas turbine device may be implemented by a read-only memory (ROM), a random access memory (RAM), an erasable programmable read-only memory (EPROM), an electrically erasable programmable read-only memory (EEPROM), a flash memory, a static RAM (SRAM), a hard disk drive (HDD), a solid-state drive (SSD), or the like.

As shown in FIG. 5, the estimated camber line and the estimated chord length are shown, as the estimated date 520, in a state where it is assumed that the blade has been deformed. Accordingly, it may be confirmed that the positions of the leading edge and the trailing edge of the blade are displaced by deformation, and thereby, the estimated chord length is also different from the reference data.

The first embodiment of the compressor according to the present disclosure has been described above with reference to FIGS. 3 to 5. Hereinafter, a second embodiment of the compressor will be described with reference to FIGS. 6 to 8.

Figure 6:
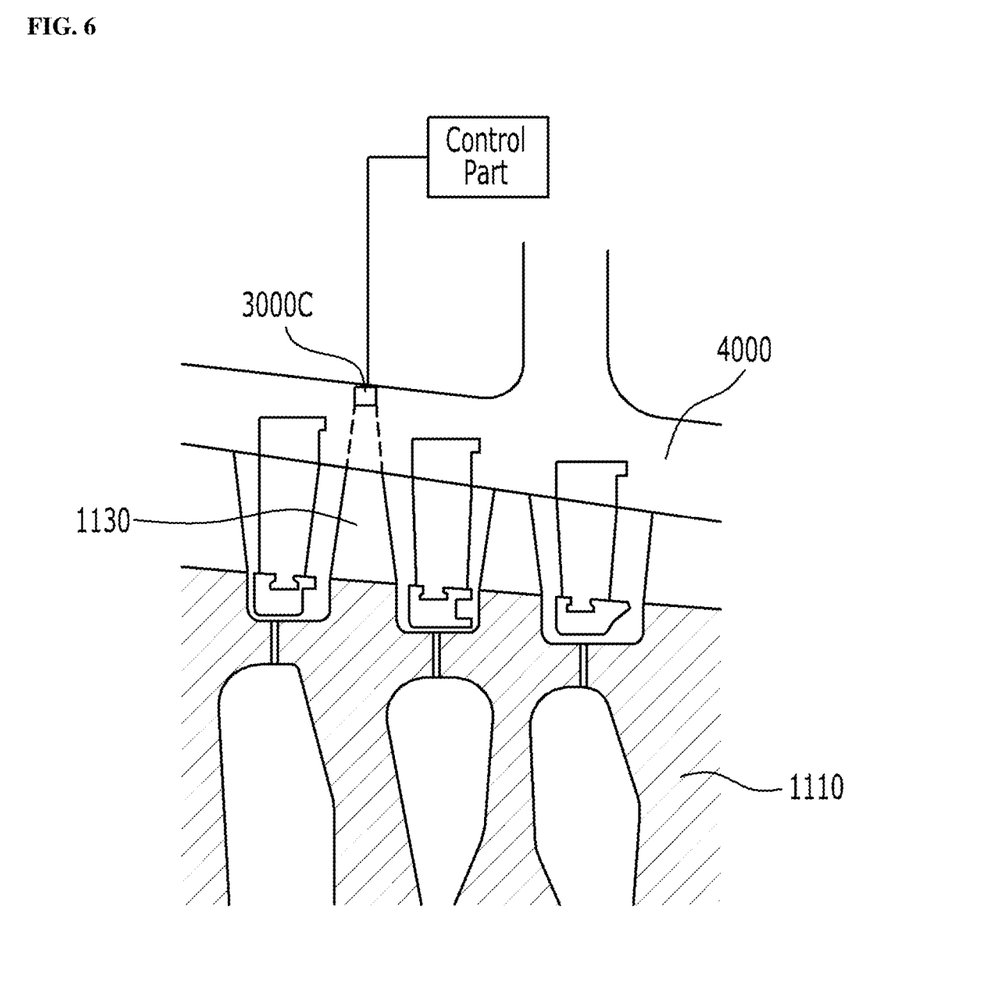
FIG. 6 is a diagram illustrating the compressor according to another embodiment of the present disclosure.

FIG. 6 illustrates the compressor according to the second embodiment of the present disclosure. The compressor according to the second embodiment includes the rotor disk 1110, the plurality of blades 1130, and a monitoring part 3000c. The compressor of the second embodiment may include a control part for performing logic for determining whether the blade has been deformed. Previous embodiments may be referenced for a description of the rotor disk 1110 and the blade 1130. In the present embodiment, the functions of the monitoring part 3000c and the control part will be described in detail.

The monitoring part 3000c is configured to acquire the shape image of the rotating blade 1130. More specifically, the monitoring part 3000c is configured to detect the passing time point of the blade 1130 when the blade 1130 rotates, and to acquire the planar shape image of the blade 1130 at that instant. At this time, it is assumed that the monitoring part 3000c is provided at the position facing the tip of the blade, and preferably, as in FIG. 6, may be provided in a vane carrier 4000.

Figure 7:
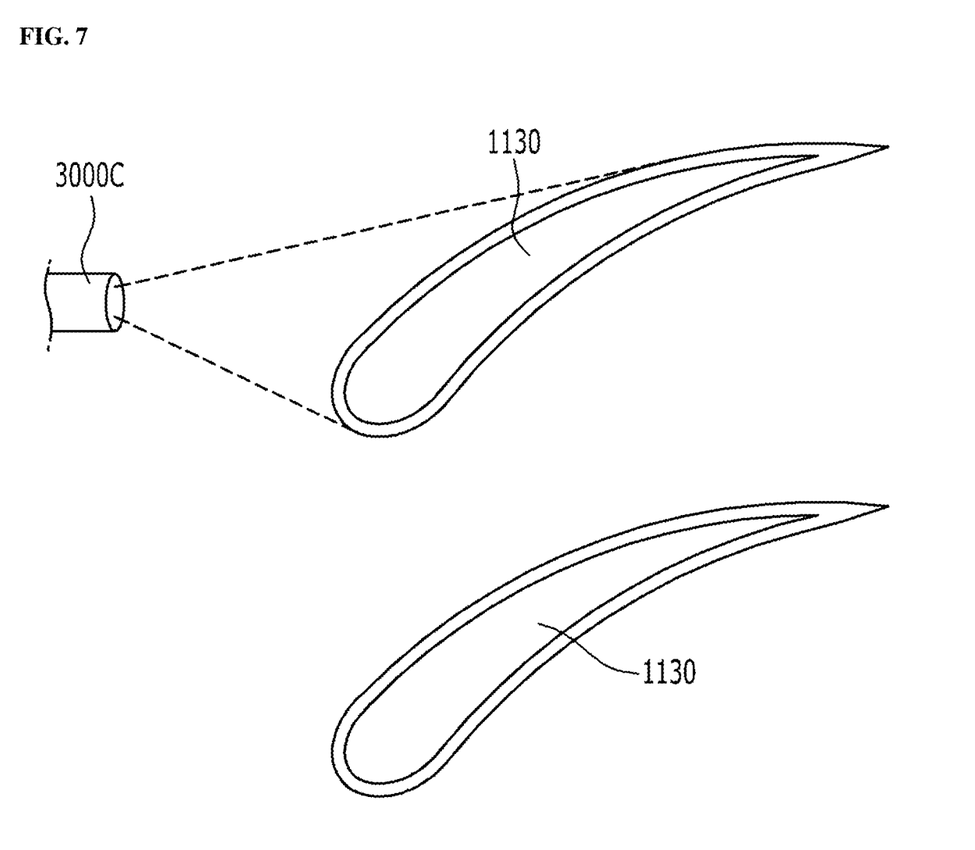
FIG. 7 is a diagram of blades of the compressor of FIG. 6 and a monitoring part acquiring the shape image of a blade.

FIG. 7 shows the monitoring part 3000c acquiring the planar shape image of the blade 1130. Although depicted for the sake of convenience at the left side of the drawing, it should be understood that the monitoring part 3000c is in fact arranged so as to face the tip of the blade in order to effectively acquire the planar shape image of the blade.

After the planar shape image of the blade has been acquired by the monitoring part 3000c, the control part may use the previously acquired shape image to determine whether the blade 1130 has been deformed. For example, the control part may photograph the blade and compare the shape image with the previously stored reference data, that is, the shape image of the blade in the steady state to determine whether the blade has been deformed. At this time, the control part may determine whether the blade has been deformed by using a method for comparing only the line extracted by tracing only the outline of the blade in the shape image with the outline of the reference data, or a method for extracting only the camber line from the leading edge to the trailing edge of the blade in the shape image and then comparing it with the camber line of the reference data, or the like. The monitoring part 3000c may measure a gap value of the blade, which is a measured value between the estimated chord length (520) of the blade with the reference data 510 obtained to determine whether the blade has been deformed. For example, the control part may determine whether the measured gap value is outside a predetermined range and, if so, thus determine that the blade has been deformed.

Figure 8:
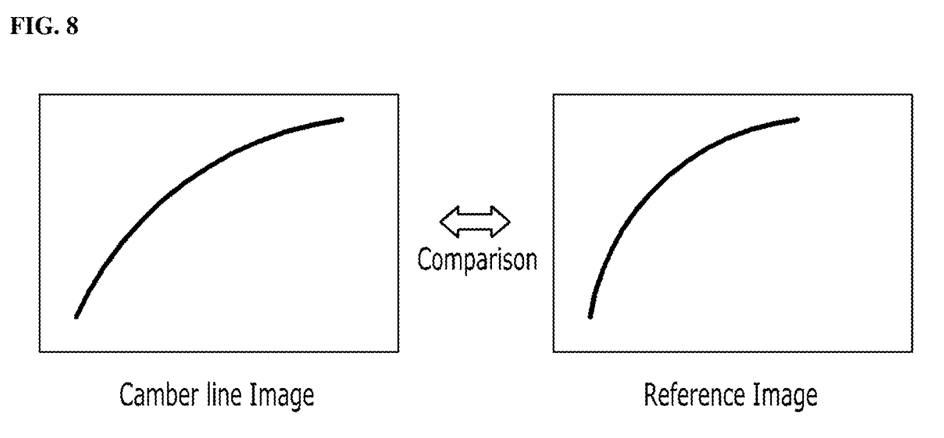
FIG. 8 is a comparison diagram of the acquired shape image and a reference image.

FIG. 8 illustrates an embodiment in which the control part extracts a camber line image from the shape image previously acquired by the monitoring part 3000c, and compares it with the reference data stored in the storage part, that is, the camber line of the blade in the steady state.

As described above, the gas turbine device according to the present disclosure may have the tip sensor or the monitoring part at the position facing the tip of the blade, and may determine whether the blade has been deformed by using the information acquired from these configurations, for example, the time at which the edges pass, the planar shape image of the blade, or the like.

As described above, although the embodiments of the present disclosure have been described with reference to the drawings, those skilled in the art to which the present disclosure pertains will be able to understand that the present disclosure may be implemented in other specific forms without changing the technical spirit or essential characteristic thereof. Accordingly, it should be understood that the above-described embodiments are only illustrative, but are not limited thereto.

What is claimed is:

1. A compressor comprising:
    a rotor disk having an outer circumference on which a blade is formed, the rotor disk being a part of a gas turbine including the compressor;
    a storage configured to store a chord length of the blade in a steady state as first reference data and a width (w) of the rotor disk as specified by a manufacturer as second reference data;
    a monitoring part for monitoring a driving state of the blade in order to acquire monitoring information on the driving state of the blade, the monitoring information including a first time point at which a leading edge of the blade passes and a second time point at which a trailing edge of the blade passes, the monitoring part configured to detect the first time point of the leading edge and the second time point of the trailing edge and to acquire the detected first time point and the second time point; and
    a control part for determining whether the blade has been deformed based on the monitoring information, the control part being a controller configured to receive the first time point of the leading edge and the second time point of the trailing edge and to determine whether the blade has been deformed based on the received first time point of the leading edge and the received second time point of the trailing edge,
    wherein the monitoring part comprises:
        a first tip sensor for detecting the first time point at which the leading edge of the blade passes and for acquiring the first time point; and
        a second tip sensor for detecting the second time point at which the trailing edge of the blade passes and for acquiring the second time point, and
    wherein the controller is further configured to
        calculate a time difference ($\Delta t$) between the detected first time point of the leading edge and the detected second time point of the trailing edge,
        multiply a rotor speed ($V_{rotor}$) of the rotor disk by the time difference ($\Delta t$) to obtain a height (h) between a horizontal tangent to the leading edge and a horizontal tangent to the trailing edge,
        estimate a chord length ($L_{chord}$) of the blade based on the height (h) and the width (w), and
        determine the blade has been deformed when the estimated chord length is outside a predetermined range of values, the predetermined range of values corresponding to the chord length of the blade in the steady state.

2. The compressor of claim 1, wherein the first tip sensor is disposed at a position facing the leading edge, and the second tip sensor is disposed at a position facing the trailing edge.

3. The compressor of claim 1, wherein the controller is further configured to compare the estimated chord length of the blade with the first reference data to determine whether the blade has been deformed.

4. The compressor of claim 1,
    wherein the monitoring part is further configured to measure a gap value of the blade, the gap value being a measured value between the estimated chord length of the blade and the chord length of the stored first reference data, and
    wherein the controller is further configured to determine whether the measured gap value is outside a predetermined range to determine whether the blade has been deformed.

5. The compressor of claim 1,
    wherein the monitoring part is configured to generate a shape image of the blade in operation, and
    wherein the controller is further configured to receive the shape image of the blade generated by the monitoring part and to determine whether the blade has been deformed from the received shape image.

6. The compressor of claim 5, wherein the monitoring part is arranged in a vane carrier and is radially spaced apart from a tip of the blade.

7. A gas turbine comprising a compressor for compressing air; a combustor for producing combustion gas by combusting a mixture of fuel and the compressed air; and a turbine for generating a rotation power by the combustion gas, wherein the compressor comprises:
    a rotor disk having an outer circumference on which a blade is formed;
    a storage configured to store a chord length of the blade in a steady state as first reference data and a width (w) of the rotor disk specified by a manufacturer as second reference data;
    a monitoring part for monitoring a driving state of the blade in order to acquire monitoring information on the driving state of the blade, the monitoring information including a first time point at which a leading edge of the blade passes and a second time point at which a trailing leading edge of the blade passes, the monitoring part configured to detect the first time point of the leading edge and the second time point of the trailing edge and to acquire the detected first time point and the second time point; and
    a control part for determining whether the blade has been deformed based on the monitoring information, the control part being a controller configured to receive the first time point of the leading edge and the second time point of the trailing edge and to determine whether the blade has been deformed based on the received first time point of the leading edge and the received second time point of the trailing edge,
    wherein the monitoring part comprises:
        a first tip sensor for detecting the first time point at which the leading, edge of the blade passes and for acquiring the first time point; and
        a second tip sensor for detecting the second time point at which the trailing edge of the blade passes and for acquiring the second time point, and
    wherein the controller is further configured to
        calculate a time difference ($\Delta t$) between the detected first time point of the leading edge and the detected second time point of the trailing edge,
        multiply a rotor speed ($V_{roror}$) of the rotor disk by the time difference ($\Delta t$) to obtain a height (h) between a horizontal tangent to the leading edge and a horizontal tangent to the trailing edge, estimate a chord length (Lchord) of the blade based on the height (h) and the width (w), and determine the blade has been deformed when the estimated chord length is outside a predetermined range of values, the predetermined range of values corresponding to the chord length of the blade in the steady state.

8. The gas turbine of claim 7, wherein the monitoring part of the compressor is configured to generate a shape image of the blade in operation, and wherein the controller of the compressor is further configured to receive the shape image of the blade generated by the monitoring part and to determine whether the blade has been deformed from the received shape image.

9. A method for determining whether a blade in a compressor has been deformed, the blade formed on an outer circumference of a rotor disk as a part of a gas turbine including the compressor, the method comprising:

storing as first reference data a chord length of the blade in a steady state and storing as second reference data a width (w) of the rotor disk specified by a manufacturer;

(a) monitoring a driving state of the blade in order to acquire monitoring information on the driving state of the blade, the monitoring information including a first time point at which a leading edge of the blade passes and a second time point at which a trailing edge of the blade passes, the monitoring including detecting, by a first tip sensor, the first time point of the leading edge and detecting, by a second tip sensor, the second time point of the trailing edge and acquiring the detected first time point and the second time point; and (b) determining whether the blade has been deformed based on the detected first time point of the leading edge and the detected second time point of the trailing edge, the step (b) further comprising:

calculating a time difference ($\Delta t$) between the detected first time point of the leading edge and the detected second time point of the trailing edge;

multiplying a rotor speed (Vrotor) of the rotor disk by the time difference ($\Delta t$) to obtain a height (h) between a horizontal tangent to the leading edge and a horizontal tangent to the trailing edge;

estimating a chord length (Lchord) of the blade based on the height (h) and the width (w); and determining the blade has been deformed when the estimated chord length is outside a predetermined range of values, the predetermined range of values corresponding to the chord length of the blade in the steady state.

10. The method of claim 9, further comprising:

(b-4) determining whether the blade has been deformed based on a comparison result between the value of the estimated chord length of the blade and previously stored first reference data.

11. The method of claim 9, wherein the monitoring includes photographing the shape image of the rotating blade, and wherein the determining includes comparing the shape image of the blade with previously stored first reference data in order to determine whether the blade has been deformed according to the comparison result.

* * * * *